US012608454B2

(12) United States Patent
Okamura et al.

(10) Patent No.: US 12,608,454 B2
(45) Date of Patent: Apr. 21, 2026

(54) VEHICLE, CONTROL DEVICE AND CONTROL METHOD THEREFOR, AND STORAGE MEDIUM

(71) Applicant: HONDA MOTOR CO., LTD., Tokyo (JP)

(72) Inventors: Kenji Okamura, Tokyo (JP); Hidetoshi Chikamori, Tokyo (JP); Kazune Hasegawa, Tokyo (JP); Tomoya Takayama, Tokyo (JP); Shota Hoshaku, Tokyo (JP); Koichiro Wada, Tokyo (JP); Masashi Kanesaka, Tokyo (JP); Akio Futatsudera, Tokyo (JP); Takuma Kobayashi, Tokyo (JP); Satoshi Sadamura, Tokyo (JP); Hiroshi Akiyama, Tokyo (JP); Nozomu Hirosawa, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 57 days.

(21) Appl. No.: 18/734,490

(22) Filed: Jun. 5, 2024

(65) Prior Publication Data

US 2024/0411844 A1     Dec. 12, 2024

(30) Foreign Application Priority Data

Jun. 12, 2023    (JP) ................................. 2023-096440

(51) Int. Cl.
*G06F 21/31*         (2013.01)
*B60W 30/12*         (2020.01)
(Continued)

(52) U.S. Cl.
CPC ............. *G06F 21/31* (2013.01); *B60W 30/12* (2013.01); *B60W 40/08* (2013.01); *B60W 50/14* (2013.01);
(Continued)

(58) Field of Classification Search
CPC ....... G06F 21/31; B60W 30/12; B60W 40/08; B60W 50/14; B60W 2540/215;
(Continued)

(56) References Cited

U.S. PATENT DOCUMENTS 10,809,721 B2   10/2020  Urano
11,235,723 B2    2/2022  Okuma et al.
(Continued)

FOREIGN PATENT DOCUMENTS

JP        2014-041449  A      3/2014
JP        2018-105774  A      7/2018
(Continued)

OTHER PUBLICATIONS

Japanese Office Action for Japanese Patent Application No. 2023096440 mailed Dec. 2, 2024 (partially translated).

*Primary Examiner* — Naomi J Small
(74) *Attorney, Agent, or Firm* — THOMAS | HORSTEMEYER, LLP

(57)     ABSTRACT

A control device for controlling a vehicle includes a travel control unit configured to provide a plurality of functions related to traveling of the vehicle, and a management unit configured to manage agreement information about whether a driver of the vehicle agrees to the vehicle using specific personal information acquired by a sensor of the vehicle. The number of functions executable in a case where the driver does not agree to use of the specific personal information out of the plurality of functions is smaller than the number of functions executable in a case where the driver agrees to the use of the specific personal information out of the plurality of functions.

11 Claims, 7 Drawing Sheets

400

PERSONAL INFORMATION SETTINGS

DISAGREEMENT   AGREEMENT
— 401

NORMAL PERSONAL
INFORMATION (VIN)

SENSITIVE PERSONAL
INFORMATION

MICROPHONE INFORMATION — 402

CAMERA INFORMATION — 403

POSITION INFORMATION — 404

PERSONAL INFORMATION SHARING — 405

(51) Int. Cl.
    *B60W 40/08*         (2012.01)
    *B60W 50/14*         (2020.01)

(52) U.S. Cl.
    CPC ............... *B60W 2040/0809* (2013.01); *B60W 2040/0818* (2013.01); *B60W 2050/143* (2013.01); *B60W 2050/146* (2013.01); *B60W 2540/043* (2020.02); *B60W 2540/045* (2020.02); *B60W 2540/215* (2020.02)

(58) Field of Classification Search
    CPC ..... B60W 2540/043; B60W 2540/045; B60W 2040/0809; B60W 2040/0818; B60W 2050/143; B60W 2050/146
    USPC ....................................................... 340/5.81
    See application file for complete search history.

(56) References Cited

U.S. PATENT DOCUMENTS

| | | | |
|---|---|---|---|
| 11,667,282 | B2 | 6/2023 | Inoue et al. |
| 2017/0019763 | A1* | 1/2017 | Chi ........................ H04W 4/029 |
| 2018/0181128 | A1 | 6/2018 | Urano |
| 2019/0047586 | A1* | 2/2019 | Sekine ........... B60W 30/18163 |
| 2020/0047697 | A1* | 2/2020 | Okuma ................ B60Q 1/0076 |
| 2020/0156641 | A1* | 5/2020 | Kretschmann .... B60W 50/0097 |
| 2020/0207341 | A1 | 7/2020 | Inoue et al. |
| 2020/0307642 | A1* | 10/2020 | Tsuji ..................... B60W 10/04 |
| 2022/0377501 | A1* | 11/2022 | Vial Maceratta . H04M 1/72454 |
| 2025/0289452 | A1* | 9/2025 | Yoshikawa ........... B60W 50/12 |

FOREIGN PATENT DOCUMENTS

| | | | |
|---|---|---|---|
| JP | 2019-034638 | A | 3/2019 |
| JP | 2020-026168 | A | 2/2020 |
| JP | 2020-104796 | A | 7/2020 |
| JP | 2021-144578 | A | 9/2021 |

* cited by examiner

F I G. 3

212

| 301 | 302 VIN | 303 MICROPHONE INFORMATION | 304 CAMERA INFORMATION | 305 POSITION INFORMATION |
|---|---|---|---|---|
| EXTENDED ASSIST FUNCTION | NOT NECESSARY | NOT NECESSARY | NECESSARY | NECESSARY |
| LANE CHANGE FUNCTION (WITH MAP) | NOT NECESSARY | NOT NECESSARY | NECESSARY | NECESSARY |
| EMERGENCY DECELERATION FUNCTION | NOT NECESSARY | NOT NECESSARY | NECESSARY | NOT NECESSARY |
| CURVE DECELERATION FUNCTION | NOT NECESSARY | NOT NECESSARY | NOT NECESSARY | NECESSARY |
| COLLISION REDUCTION BRAKING FUNCTION | NOT NECESSARY | NOT NECESSARY | NOT NECESSARY | NOT NECESSARY |
| FOLLOW-UP FUNCTION | NOT NECESSARY | NOT NECESSARY | NOT NECESSARY | NOT NECESSARY |
| LANE KEEPING FUNCTION | NOT NECESSARY | NOT NECESSARY | NOT NECESSARY | NOT NECESSARY |
| MAP UPDATE FUNCTION | NECESSARY | NOT NECESSARY | NOT NECESSARY | NOT NECESSARY |

F I G. 5
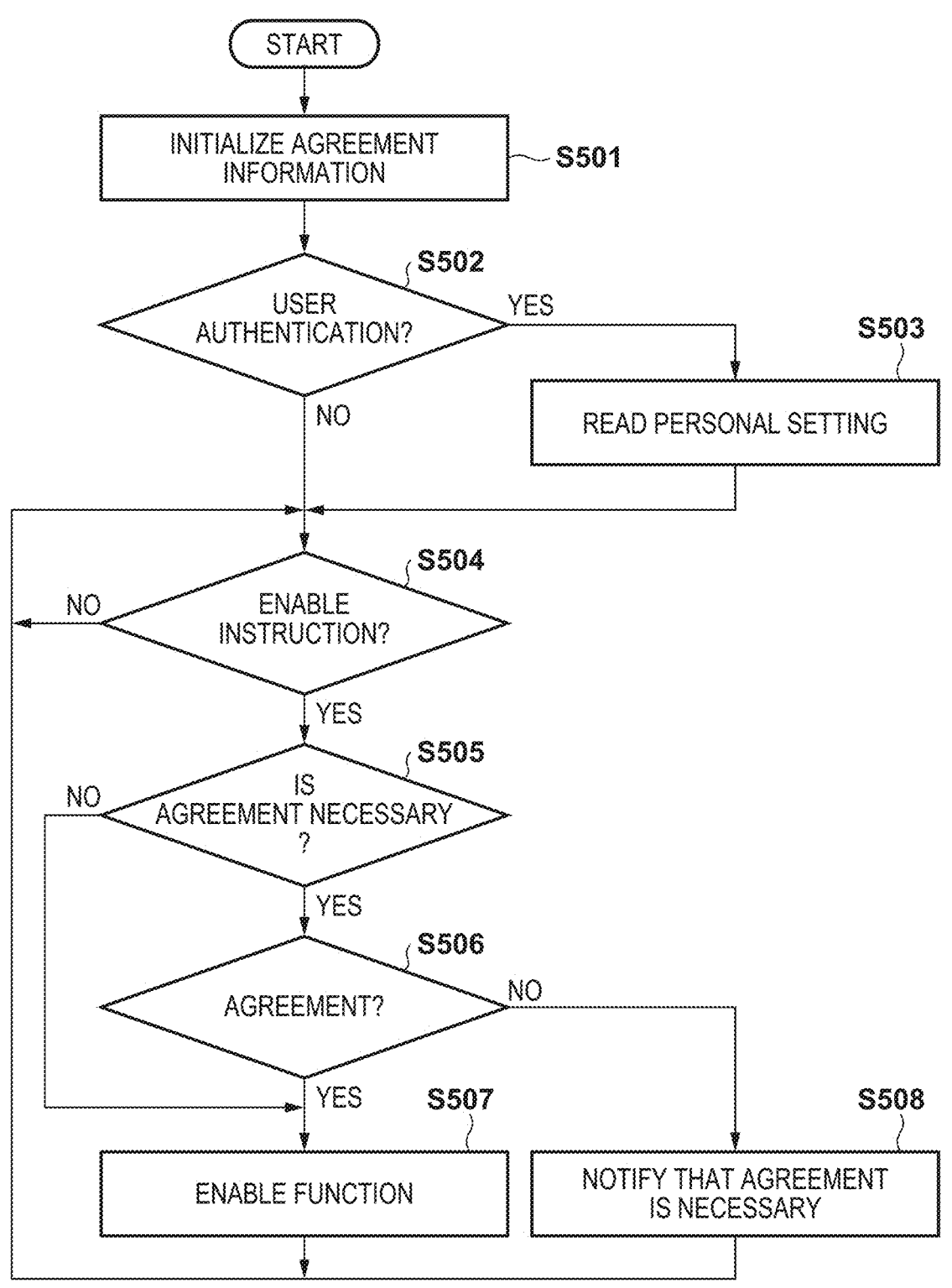

F I G. 7
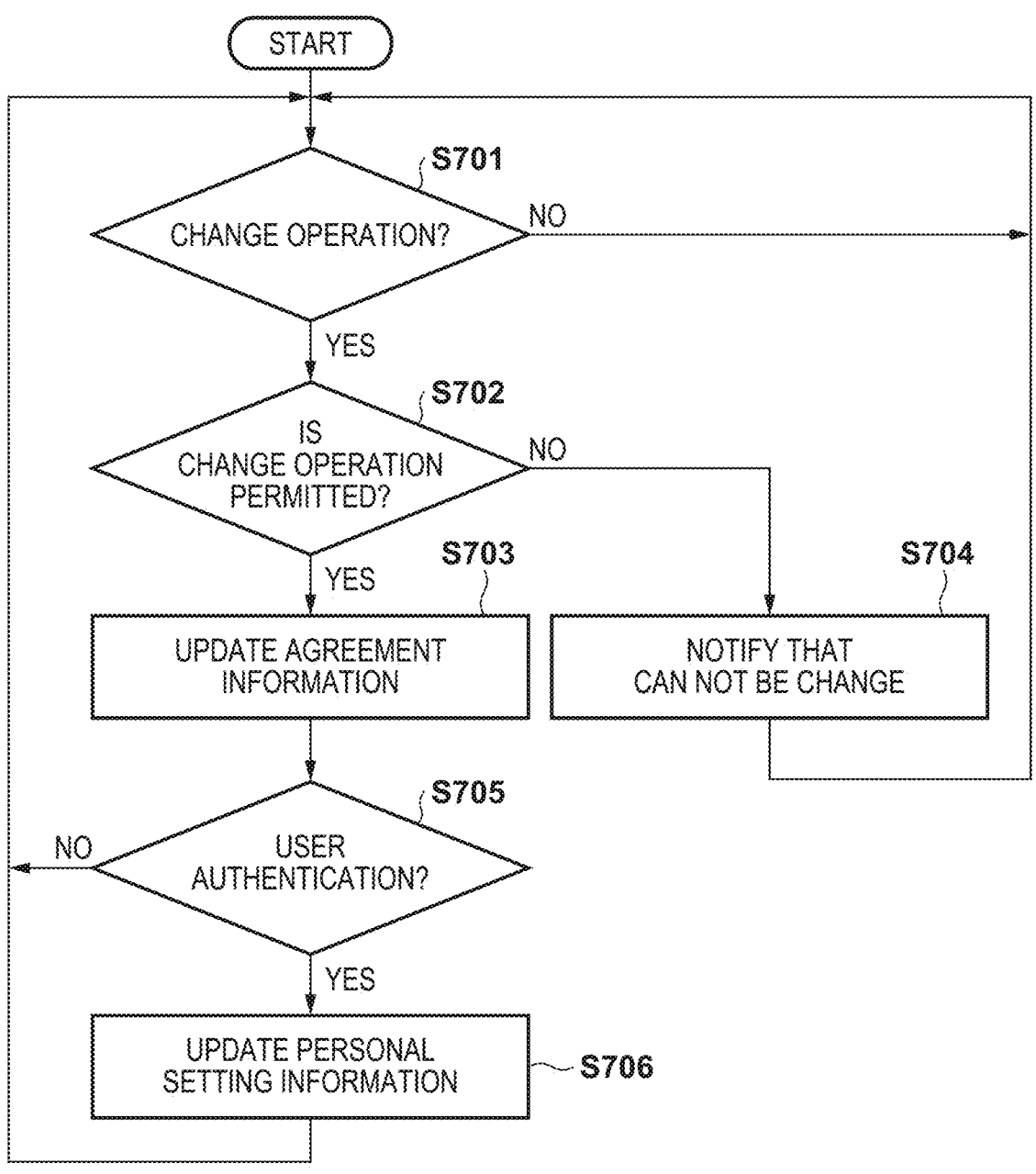

VEHICLE, CONTROL DEVICE AND CONTROL METHOD THEREFOR, AND STORAGE MEDIUM

CROSS-REFERENCE TO RELATED APPLICATION(S)

This application claims priority to and the benefit of Japanese Patent Application No. 2023-096440, filed Jun. 12, 2023, the entire disclosure of which is incorporated herein by reference.

BACKGROUND OF THE INVENTION

Field of the Invention

The present invention relates to a vehicle, a control device and a control method therefor, and a storage medium.

Description of the Related Art

The driver of a vehicle having a travel control function is requested to approve a use condition of the travel control function. A code is generated on a system in response to the driver having approved the use condition, and the travel control function is enabled. Japanese Patent Laid-Open No. 2019-034638 describes restricting a part of the travel control function of the vehicle until the code is approved, and releasing the restriction of the travel control function after the code is approved. Personal information of the driver of the vehicle can be used for performing the travel control function.

SUMMARY OF THE INVENTION

According to some aspects of the present disclosure, a technique for appropriately protecting personal information of the driver of a vehicle is provided. According to some embodiments, a control device for controlling a vehicle, the control device comprising: a travel control unit configured to provide a plurality of functions related to traveling of the vehicle; and a management unit configured to manage agreement information about whether a driver of the vehicle agrees to the vehicle using specific personal information acquired by a sensor of the vehicle, wherein the number of functions executable in a case where the driver does not agree to use of the specific personal information out of the plurality of functions is smaller than the number of functions executable in a case where the driver agrees to the use of the specific personal information out of the plurality of functions is provided.

BRIEF DESCRIPTION OF THE DRAWINGS

FIG. 3 is a diagram for describing an example of necessary agreement information in some embodiments;
FIG. 5 is a flowchart for describing an operation example for enabling a function in some embodiments;

FIG. 7 is a flowchart for describing an operation example for changing an agreement setting in some embodiments.

DESCRIPTION OF THE EMBODIMENTS

Figure 1:
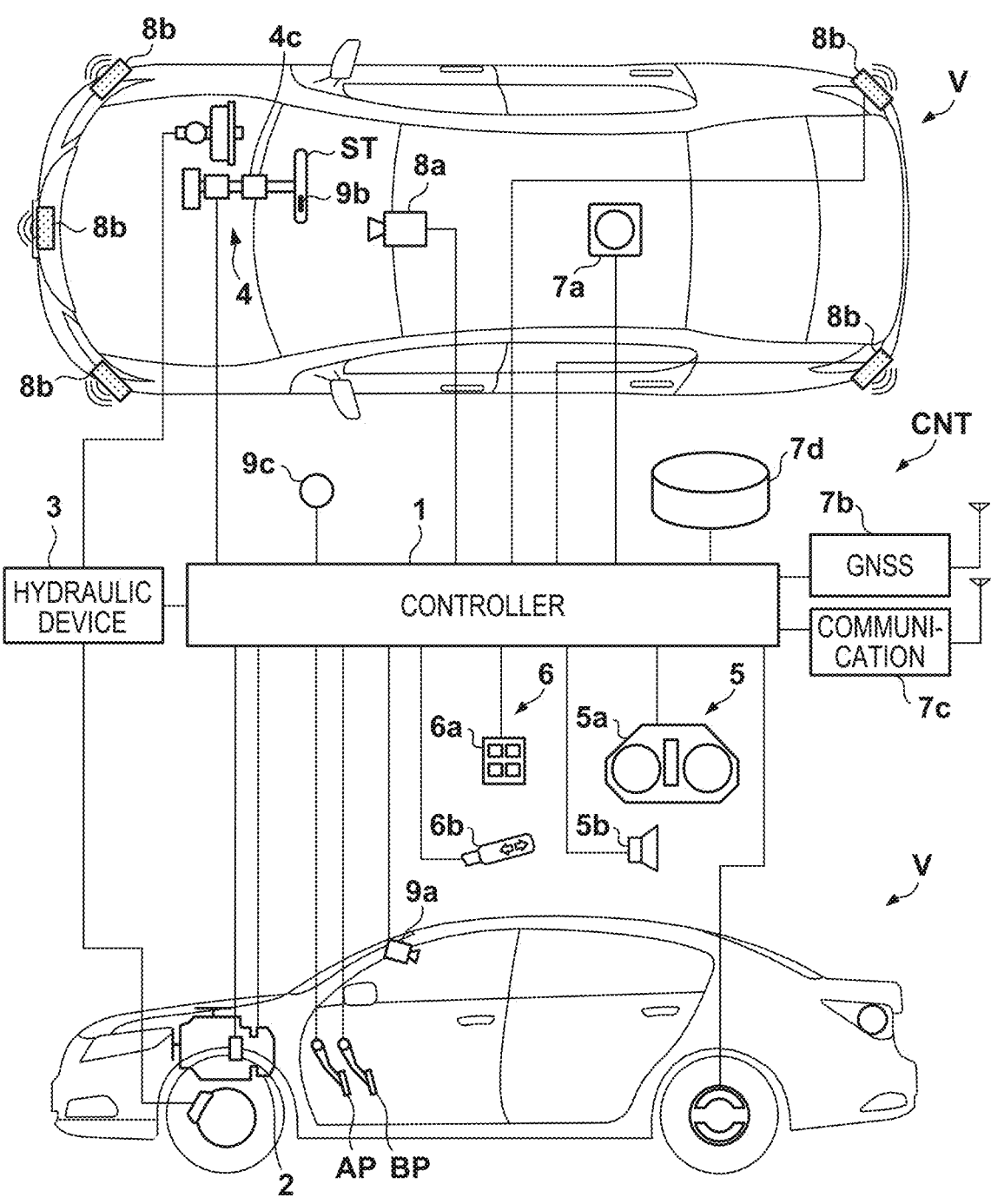
FIG. 1 is a block diagram illustrating a configuration example of a vehicle in some embodiments.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

FIG. 1 is a block diagram of a control device CNT according to an embodiment of the present invention, and is also a schematic diagram of a vehicle V, which is an application example thereof. In FIG. 1, an outline of the vehicle V is illustrated in a plan view and a side view. The vehicle V in the present embodiment is, as an example, a sedan-type four-wheeled passenger vehicle, and can be, for example, a parallel hybrid vehicle. The vehicle V is not limited to the four-wheeled passenger vehicle, and may be a straddle type vehicle (a two-wheeled or three-wheeled motorcycle) or a large-sized vehicle such as a truck or a bus.

The control device CNT includes a controller 1, which is an electronic circuit that conducts control of the vehicle V, including driving assist of the vehicle V. The controller 1 includes a plurality of electronic control units (ECUs). For example, an ECU is provided for each function of the control device CNT. Each ECU includes a processor represented by a central processing unit (CPU), a storage device such as a semiconductor memory, an interface with an external device, and the like. The storage device stores a program to be executed by the processor, data used for processing by the processor, and the like. The interface includes an input and output interface, and a communication interface. Each ECU may include a plurality of processors, a plurality of storage devices, and a plurality of interfaces. A program to be stored in the storage device may be installed by the control device CNT using a storage medium such as a CD-ROM so as to be stored in the storage device. Additionally or alternatively, the program to be stored in the storage device may be downloaded from an external server on wireless communication.

The controller 1 controls an information output device 5, which notifies information to the inside of the vehicle. The information output device 5 includes, for example, a display device 5a, which notifies the driver of information on an image, and/or a sound output device 5b, which notifies the driver of information by sound. Examples of the display device 5a include a display device provided in an instrument panel, and a display device provided in a steering wheel ST. In addition, the display device 5a may include a head-up display. The information output device 5 may notify an occupant of information by vibration or light.

The controller 1 receives an instruction input from the occupant (for example, the driver) via an input device 6. The input device 6 is disposed at a position at which the driver is able to operate it, and includes, for example, a switch group 6a for the driver to give an instruction to the vehicle V, and/or a blinker lever 6b to activate a direction indicator (blinker).

The controller 1 recognizes and determines a current position and a course (an attitude) of the vehicle V. In the present embodiment, the vehicle V includes a gyro sensor 7a, a global navigation satellite system (GNSS) sensor 7b, and a communication device 7c. The gyro sensor 7a detects a rotational motion (yaw rate) of the vehicle V. The GNSS sensor 7b is an example of a positioning sensor for detecting the current position of the vehicle V. In addition, the communication device 7c performs wireless communication with a server that provides map information and traffic information, and acquires these pieces of information. In the present embodiment, the controller 1 determines the course of the vehicle V, based on detection results of the gyro sensor 7a and the GNSS sensor 7b, also sequentially acquires map information about the course from the server via the communication device 7c, and stores the map information in a database 7d (a storage device). The vehicle V may also include another sensor for detecting a state of the vehicle V, such as an acceleration sensor for detecting acceleration of the vehicle V.

The controller 1 performs driving assist of the vehicle V, based on detection results of various detection units provided in the vehicle V. The vehicle V includes surroundings detection units 8a and 8b, each of which is an external sensor for detecting the outside (a surrounding situation) of the vehicle V, and in-vehicle detection units 9a to 9c, each of which is an in-vehicle sensor for detecting a state inside the vehicle (states of occupants, particularly, the driver). The controller 1 grasps the surrounding situation of the vehicle V, based on detection results of the surroundings detection units 8a and 8b, and is capable of performing the driving assist in accordance with the surrounding situation. In addition, the controller 1 is capable of determining whether the driver is doing a predetermined operation duty imposed on the driver, in performing the driving assist, based on detection results of the in-vehicle detection units 9a to 9c.

The surroundings detection unit 8a is an imaging device (hereinafter, referred to as a front camera 8a, in some cases) that images a forward side of the vehicle V, and is attached to, for example, the vehicle interior side of the windshield in a front part of the roof of the vehicle V. The controller 1 analyzes an image that has been captured by the front camera 8a, and is capable of extracting a contour of a target object or a lane marking (such as a white line) on a road.

The surroundings detection unit 8b is a millimeter wave radar (hereinafter, referred to as a radar 8b, in some cases), detects a target object in the surroundings of the vehicle V by use of radio waves, and detects (measures) a distance to the target object and a direction (an azimuth) of the target object with respect to the vehicle V. In the example illustrated in FIG. 1, five radars 8b are provided, including one at the center of the front part of the vehicle V, one at each of left and right corner portions of the front part, and one at each of the left and right corner portions of a rear part.

The surroundings detection unit provided in the vehicle V is not limited to the above configuration. The number of cameras and the number of radars may be changed. A light detection and ranging (LiDAR) for detecting a target object in the surroundings of the vehicle V may be provided.

The in-vehicle detection unit 9a is an imaging device (hereinafter, referred to as an in-vehicle camera 9a, in some cases) that images the inside of the vehicle, and is attached to, for example, the vehicle interior side in the front part of the roof of the vehicle V. In the present embodiment, the in-vehicle camera 9a is a driver monitor camera that images the driver (for example, driver's eye and face). The controller 1 analyzes an image (an image of the driver's face) that has been captured by the in-vehicle camera 9a, and is capable of determining a driver's line of sight and a direction of a driver's face.

The in-vehicle detection unit 9b is a grip sensor (hereinafter, referred to as a grip sensor 9b, in some cases) for detecting the driver gripping the steering wheel ST, and is provided on, for example, at least a part of the steering wheel ST. As the in-vehicle detection unit, a torque sensor 4c, which detects the steering torque of the driver, may be used.

The in-vehicle detection unit 9c is a microphone for detecting sounds inside the vehicle (hereinafter, referred to as an in-vehicle microphone 9c, in some cases), and is attached to, for example, an instrument panel of the vehicle V.

Driving assist functions of the vehicle V for the driver may include, for example, an acceleration and deceleration assist function, a lane keeping assist function, and a lane change assist function. The acceleration and deceleration assist function may include a follow-up function (adaptive cruise control (ACC)) of automatically controlling acceleration and deceleration of the vehicle V within a predetermined vehicle speed, by the controller 1 automatically controlling a power unit 2 and a hydraulic device 3, based on the detection results of the surroundings detection units 8 and the map information. In the ACC, when there is a preceding vehicle, the acceleration and deceleration of the vehicle V is enabled so as to maintain an inter-vehicle distance from the preceding vehicle. The ACC reduces an operation load of the driver in acceleration and deceleration operations (operations on an accelerator pedal AP and a brake pedal BP).

The acceleration and deceleration assist function may include an emergency deceleration function of automatically decelerating the vehicle V in accordance with detection of an occurrence of abnormality in the driver. The acceleration and deceleration assist function may include a curve deceleration function of automatically decelerating the vehicle V before reaching a curve. The acceleration and deceleration assist function may include a collision reduction braking function of automatically decelerating the vehicle V in accordance with detection that the vehicle V is about to collide with another object (for example, another vehicle).

The lane keeping assist function may include a lane keeping function (lane keeping assist system (LKAS)) of keep the vehicle V inside a lane, by the controller 1 automatically controlling an electric power steering device 4, based on the detection results of the surroundings detection units 8 and the map information. The LKAS reduces an operation load of the driver in a steering operation (an operation on the steering wheel ST) while the vehicle V is traveling straight.

The lane change assist function may include a lane change function (auto lane changing (ALC), active lane change assist (ALCA)) of automatically changing the traveling lane of the vehicle V to an adjacent lane, by the controller 1 automatically controlling the power unit 2, the hydraulic device 3, and the electric power steering device 4, based on the detection results of the surroundings detection units 8 and the map information. The ALC denotes a lane change function based on a system request, and the ALCA denotes a lane change function based on an occupant's request. Examples of the system request include a case where a navigation system of giving a route guidance of the vehicle V to a destination requests a lane change of the vehicle V, and a case where the vehicle overtakes a preceding vehicle, regardless of presence or absence of the route guidance. In making the occupant's request, the driver operates the input device (for example, the blinker lever 6*b*), and gives an instruction of changing lanes. Both the ALC and the ALCA reduce an operation load of the driver in the acceleration and deceleration operations or the steering operation on the vehicle V, when changing lanes.

In some embodiments, the controller 1 selectively performs one of three modes including modes 1 to 3 respectively having different driving assist contents. The mode may be referred to as a state. Hereinafter, a case where the ACC, LKAS, ALC, or ALCA is provided as the driving assist will be described. However, the driving assist content in each of the modes 1 to 3 is not limited to the ACC, LKAS, ALC, or ALCA, and may include any other driving assist content. In addition, only one of the ALC and ALCA may be included.

The mode 1 is a manual driving mode of not performing any of the ACC, LKAS, ALC, or ALCA, and is based on a driver's manual driving operation. This mode is set at first, when the vehicle Vis started up. In the mode 1, the emergency deceleration function and the collision reduction braking function may be performed.

The modes 2 and 3 are set on condition that the occupant gives a driving assist instruction in the mode 1. The mode 2 is a regular assist mode in which both the ACC and LKAS are executable. In the mode 2, neither the ALC nor ALCA is performed. In the mode 2, the emergency deceleration function and the collision reduction braking function may be performed.

The mode 3 is an extended assist mode in which all of the ACC, LKAS, ALC, and ALCA are executable. The mode 3 is a mode on an assumption that the controller 1 has already acquired high-precision map information including information of the road (the traveling road) on which the vehicle V travels. The high-precision map information denotes map information including more precise information about road information than map information used for giving a route guidance to a destination (referred to as normal map information, in some cases). Specifically, the high-precision map information may include at least position information in a lane. This can be used for controlling the position in a vehicle width direction of the vehicle V. The high-precision map information may further include information about detailed shapes of roads, such as presence or absence of a curve and its curvature, an increase or a decrease in lane, and a gradient. The high-precision map information is prepared, for example, for each region or road section, and there can be a region or a road section in which the high-precision map information is not supplied.

In the mode 3, the lane change assist (the ALC and ALCA) is performed with use of the high-precision map information. The ALCA may be performed with the use of the normal map information without the use of the high-precision map information. By utilizing position information in the lane included in the high-precision map information and the current position of the vehicle V that has been detected by the GNSS sensor 7*b*, it becomes possible to perform highly reliable and smooth lane change assist, while recognizing other vehicles in the surroundings from the surroundings detection results of the detection units 8*a* and 8*b*. The lane change assist may be performed without the use of the high-precision map information.

Both the modes 2 and 3 are modes capable of executing the ACC and LKAS. However, in the mode 3, the ACC and LKAS with the use of the high-precision map information are executable. For transitioning to the mode 3, a requirement may be so set that an image of the driver that has been captured by the in-vehicle camera 9*a* (that is, the driver monitor camera) is available. Therefore, in a case where the driver agrees to the use of the position information of the vehicle V, but does not agree to the use of the image of the driver, transitioning to the mode 3 may be suppressed. The controller 1 acquires the road information of a travel destination of the vehicle V beforehand from the high-precision map information, is capable of performing acceleration and deceleration of the vehicle V and position control to the left and right directions, and is capable of providing the occupant with the highly reliable and smooth ACC and LKAS. In the mode 3, the emergency deceleration function, the collision reduction braking function, and the curve deceleration function may be performed.

Figure 2:
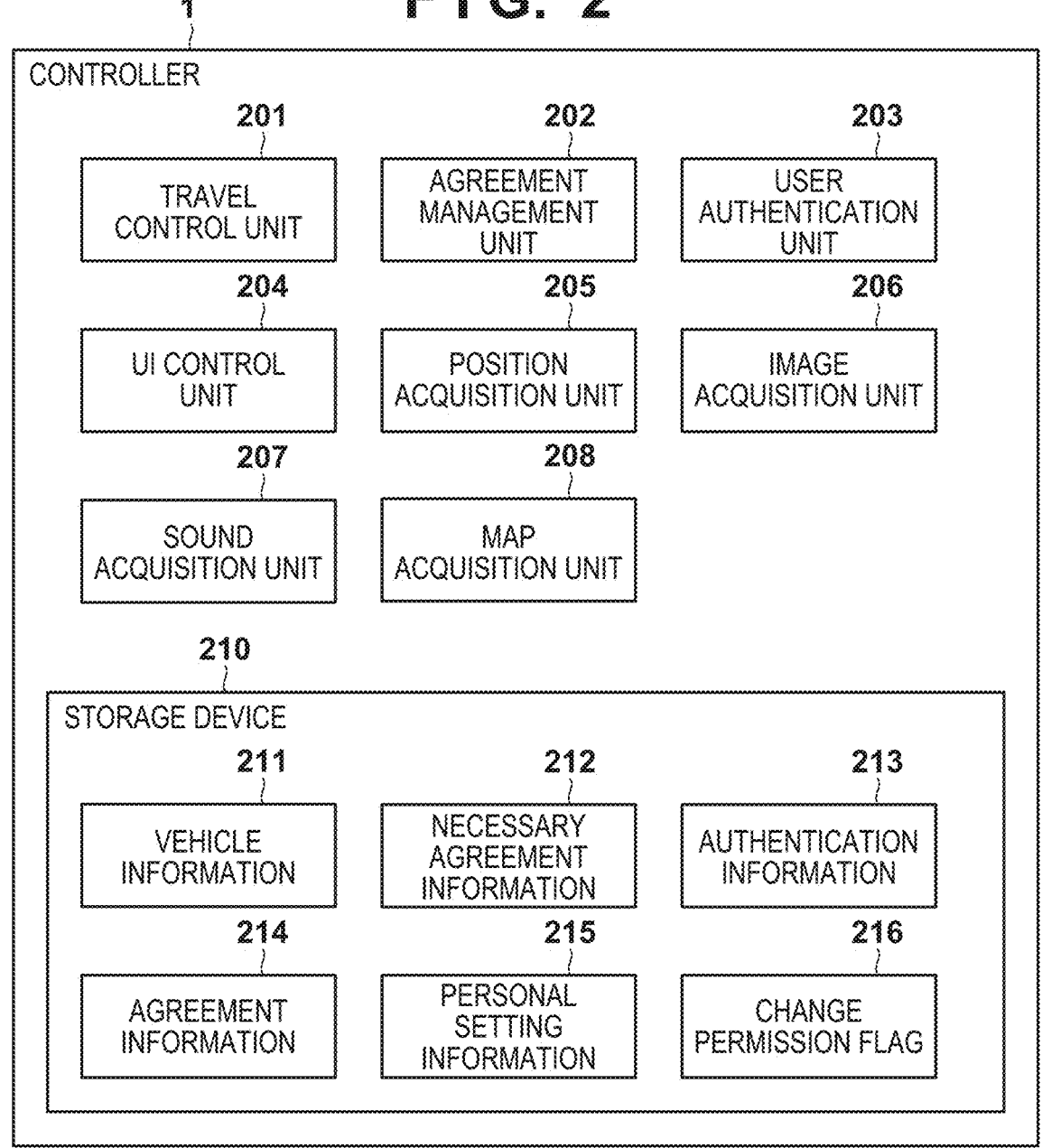
FIG. 2 is a block diagram for describing a functional configuration example of a controller of the vehicle in some embodiments.

Referring to FIG. 2, a functional configuration example of the controller 1 of the vehicle V will be described. Functional units 201 to 208 may be implemented by a processor of the controller 1 executing a program stored in a memory of the controller 1. Alternatively, at least some of the functional units 201 to 208 may be implemented by a dedicated integrated circuit such as an application specific integrated circuit (ASIC). The controller 1 may include any functional unit that is not illustrated in FIG. 2, or may not necessarily include some of the functional units illustrated in FIG. 2. Each of the functional units 201 to 208 may be implemented by a single ECU, or may be implemented by being distributed to a plurality of ECUs. Two or more of the functional units 201 to 208 may be implemented by an identical ECU.

The travel control unit 201 automatically controls at least one of acceleration, deceleration, and steering of the vehicle V, and provides a plurality of driving assist functions related to traveling of the vehicle V. The plurality of driving assist functions may include an extended assist function, the lane change function, the follow-up function, and the like in the mode 3 as described above.

The agreement management unit 202 manages agreement information about whether the driver agrees to the vehicle V (specifically, the controller 1) using specific personal information of the driver acquired by a sensor of the vehicle V. Examples of the personal information will be described later.

The user authentication unit 203 performs personal authentication of the driver of the vehicle V. For example, the user authentication unit 203 may acquire a user identifier and a password from the driver, and may determine whether the user identifier and the password match authentication information 213, which is stored in the controller 1. Alternatively or additionally, the user authentication unit 203 may acquire biological information of the driver, and may perform user authentication, based on the biological information.

The user interface (UI) control unit 204 controls a user interface (for example, the display device 5*a*, the sound output device 5*b*, or the input device 6) included in the vehicle V, acquires an input from a user (for example, the driver) of the vehicle V, and outputs information to the user of the vehicle V.

The position acquisition unit 205 acquires position information of the vehicle V that has been acquired by the GNSS sensor 7*b*. The position information may be represented by, for example, latitude and longitude. The position information of the vehicle V indicates the position where the driver is present. Therefore, the position information can be personal information of the driver.

The image acquisition unit 206 acquires camera information that has been acquired by a camera (for example, the in-vehicle camera 9*a*) mounted on the vehicle V. The camera information can include an image of the driver. Therefore, the camera information can be personal information of the driver.

The sound acquisition unit 207 acquires microphone information that has been acquired by a microphone (for example, the in-vehicle microphone 9c) mounted on the vehicle V. The microphone information can include voices of the driver. Therefore, the microphone information can be personal information of the driver.

The map acquisition unit 208 acquires map information from an external server. As described above, the map information can be used for the driving assist function in the mode 3.

The controller 1 may include a storage device 210. The storage device 210 may be one or more memories of the ECU included in the controller 1, or may be another storage device. The storage device 210 may store the information illustrated in FIG. 2. The storage device 210 may store a part of the information illustrated in FIG. 2, or may store information that is not illustrated in FIG. 2. Instead of using the information stored in the storage device 210, the controller 1 may use information stored in another storage device (may be included in the vehicle V, or may be a device outside the vehicle V).

Vehicle information 211 denotes information about the vehicle V. The vehicle information 211 may include a vehicle identification number (VIN). The VIN identifies the vehicle V that the driver is driving. Therefore, the VIN can be personal information of the driver. The vehicle information 211 may be stored in the storage device 210 by the manufacturer of the vehicle V, while manufacturing the vehicle V.

Necessary agreement information 212 indicates the type of personal information that necessitates the driver's agreement so that the controller 1 provides the driving assist function. Referring to FIG. 3, the necessary agreement information 212 is illustrated. In the example of FIG. 3, the necessary agreement information 212 is presented in a table format. Alternatively, the necessary agreement information 212 may be presented in another format.

A column 301 indicates a plurality of driving assist functions to be provided by the vehicle V (for example, the travel control unit 201). The driving assist functions indicated in the column 301 are examples. The necessary agreement information 212 may include information of another driving assist function that is not illustrated in FIG. 3, or may not necessarily include some of the driving assist functions illustrated in FIG. 3.

A column 302 indicates whether the driver's agreement is necessary so that a specific driving assist function uses the VIN. The VIN may be included in the vehicle information 211 as described above. A column 303 indicates whether the driver's agreement is necessary so that a specific driving assist function uses the microphone information. The microphone information is acquired by, for example, the sound acquisition unit 207. A column 304 indicates whether the driver's agreement is necessary so that a specific driving assist function uses the camera information. The camera information is acquired by, for example, the image acquisition unit 206. A column 305 indicates whether the driver's agreement is necessary so that a specific driving assist function uses the position information. The position information is acquired by, for example, the position acquisition unit 205.

In FIG. 3, "necessary" indicates that the driver's agreement is necessary, whereas "unnecessary" indicates that the driver's agreement is not necessary. Whether the driver's agreement is necessary so that a specific driving assist function uses the specific personal information can differ depending on the policies of the manufacturer of the vehicle V or the laws and regulations of the nation in which the vehicle V is used. The necessary agreement information 212 may be set by, for example, the manufacturer of the vehicle V, and may be stored in the storage device 210 while the vehicle V is being manufactured. Alternatively, the necessary agreement information 212 may be acquired from an external server, after the user purchases the vehicle V.

As illustrated in FIG. 3, the number of functions that are executable in a case where the driver does not agree to the use of the specific personal information out of the plurality of driving assist functions is smaller than the number of functions that are executable in a case where the driver agrees to the use of the specific personal information out of the plurality of driving assist functions. For example, in the example of FIG. 3, the number of functions (five functions) that are executable in the case where the driver does not agree to the use of the camera information out of eight driving assist functions is smaller than the number of functions (eight functions) that are executable in the case where the driver agrees to the use of the camera information out of eight driving assist functions. In this manner, by necessitating the driver's agreement in order to perform some of the plurality of driving assist functions that use the specific personal information and that are provided by the vehicle V, the personal information of the driver is appropriately protected.

The type of personal information to be used by the vehicle V may differ for every driving assist function. For example, the plurality of driving assist functions may include functions (for example, the extended assist function in the mode 3 and the lane change function in the mode 3) that are executable in the case where the driver agrees to the use of the camera information and the position information. As described above, in the mode 3, the driving assist function is performed with use of the position information of the vehicle V and the high-precision map information. Furthermore, the mode 3 may be performed on condition that the driver is monitoring the surroundings. The controller 1 may use the camera information to determine whether the driver is monitoring the surroundings.

The plurality of driving assist functions may include a function (for example, the emergency deceleration function) that is executable in the case where the driver agrees to the use of the camera information, regardless of whether the driver agrees to the use of the position information. The controller 1 may use the camera information to determine whether the driver is normal or abnormal.

The plurality of driving assist functions may include a function (for example, the curve deceleration function) that is executable in the case where the driver agrees to the use of the position information, regardless of whether the driver agrees to the use of the camera information. The controller 1 may use the position information to determine whether there is a curve on a forward side of the vehicle V.

The authentication information 213 denotes information (for example, a pair of the user identifier and the password) to be used by the user authentication unit 203 to authenticate the user. Instead of the password, the authentication information 213 may include a value derived from the password. The authentication information 213 may be stored in the storage device 210 by the user of the vehicle V setting its own user identifier and the password in the controller 1.

Agreement information 214 denotes information indicating whether the driver agrees to the vehicle V using the specific personal information. The agreement management unit 202 may acquire, from the driver, an instruction indicating that the driver agrees or disagrees to the use of the specific personal information by the vehicle V, and may update the agreement information 214 in response to the instruction. The agreement information 214 may individually store whether the driver agrees or disagrees to each of a plurality of types of personal information.

Figure 4:
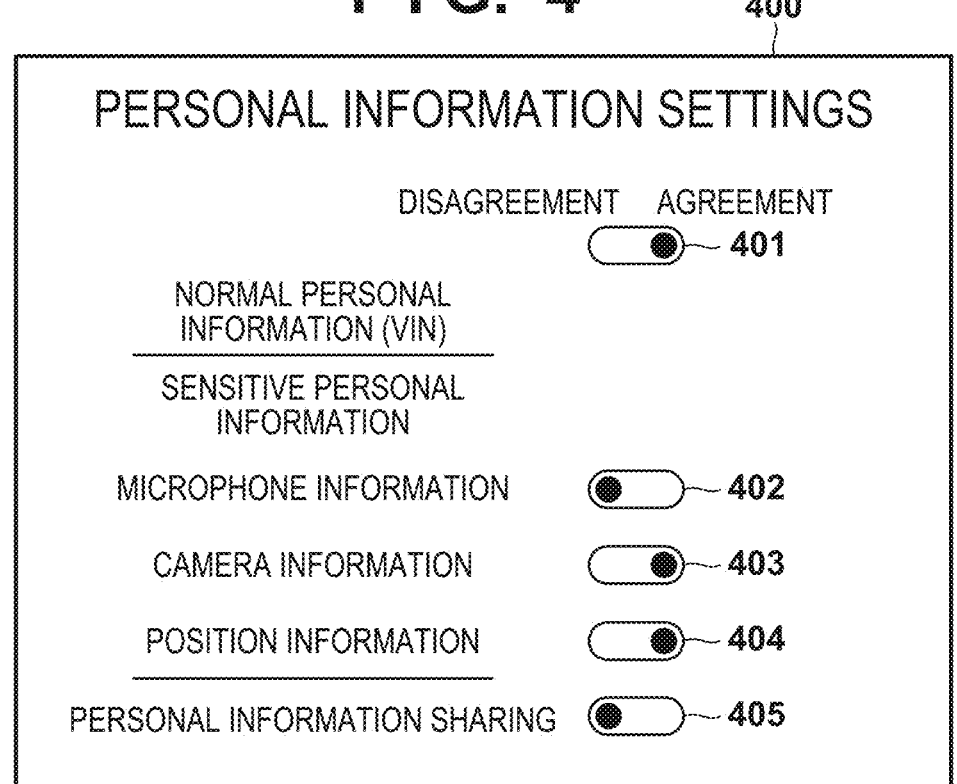
FIG. 4 is a schematic diagram for describing an example of an agreement setting screen in some embodiments.

Referring to FIG. 4, an example of a setting screen 400 is illustrated to be used for acquiring, from the driver, an instruction to agree or disagree to the vehicle V (for example, the UI control unit 204) using the specific personal information. The setting screen 400 is displayed on the display device 5a, for example. The setting screen 400 includes a plurality of toggle switches 401 to 405 for respectively giving instructions of agreement to the use of the personal information. In the example of FIG. 4, a toggle switch is used as an example of a graphical object for giving an instruction, or any other object such as a button may be used.

The toggle switch 401 is a graphical object for the driver to give an instruction to agree or disagree to the use of the VIN. The toggle switch 402 is a graphical object for the driver to give an instruction to agree or disagree to the use of the microphone information. The toggle switch 403 is a graphical object for the driver to give an instruction to agree or disagree to the use of the camera information. The toggle switch 404 is a graphical object for the driver to give an instruction to agree or disagree to the use of the position information. The toggle switch 405 is a graphical object for the driver to give an instruction to agree or disagree that the personal information is provided for a third party. In this manner, with the use of the setting screen 400, the agreement management unit 202 may individually manage whether the driver agrees to the use of each type of the personal information. Alternatively, the agreement management unit 202 may collectively manage whether the driver agrees to the use of the personal information, regardless of the type of the personal information.

Personal setting information 215 denotes information about a setting associated with a specific user. The personal setting of each user may be stored in association with the user identifier of the driver. The personal setting information 215 may include information indicating whether a specific user agrees to the vehicle V using the specific personal information. The personal setting information 215 may be set by the user of the vehicle V.

A change permission flag 216 denotes information indicating whether the driver is permitted or prohibited from performing a change operation for changing the agreement information 214. For example, in a case where it is determined that the vehicle V is not stopped, the agreement management unit 202 may prohibit the driver from performing the operation to change the agreement information 214. On the other hand, in a case where it is determined that the vehicle V is stopped, the agreement management unit 202 may permit the driver to perform the operation to change the agreement information 214.

Referring to FIG. 5, an example of a method for enabling, by the controller 1 of the vehicle V, a specific driving assist function will be described. Enabling the specific driving assist function may become capable of accepting an instruction to start the specific driving assist function, or may start the specific driving assist function. Each step in the method of FIG. 5 may be performed by a processor of the controller 1 executing a program stored in the memory of the controller 1. Alternatively, some or all of the steps in the method of FIG. 5 may be performed by a dedicated integrated circuit such as an ASIC. The method of FIG. 5 may start in accordance with the power source (for example, an ignition power supply) of the vehicle V turning on. The method of FIG. 5 may end in accordance with the power source (for example, the ignition power supply) of the vehicle V turning off.

In S501, the controller 1 (for example, the agreement management unit 202) initializes the agreement information 214 stored in the storage device 210. For example, the controller 1 may initialize the use of all types of the personal information included in the agreement information 214 to disagreement. There is a possibility that the driver of the vehicle V is different between the previous use of the vehicle V and the current use of the vehicle V. For this reason, by initializing the agreement information 214 when the vehicle V is started up, it becomes possible to suppress the use of the personal information against the current driver's will.

In S502, the controller 1 (for example, the user authentication unit 203) determines whether the personal authentication of the driver is successful. In a case where it is determined that the personal authentication of the driver is successful ("YES" in S502), the controller 1 shifts the processing to S503, and in the other case ("NO" in S502), the controller 1 shifts the processing to S504. The controller 1 may determine that the personal authentication of the driver is successful in response to an input, by the driver, of the pair of the user identifier and the password stored in the authentication information 213. Alternatively, the controller 1 may acquire the biological information of the driver, and may determine that the personal authentication of the driver is successful, in a case where such biological information is stored in the authentication information 213.

In S503, the controller 1 (for example, the agreement management unit 202) reads, from the storage device 210, the personal setting information 215, which is stored in association with the user that has been identified by the personal authentication. In a case where the personal setting information 215 includes a setting related to the agreement to the use of the personal information, the controller 1 reflects such a setting in the agreement information 214. By performing the personal authentication of the driver in this manner when the vehicle V is started up, the driver is able to use the agreement setting that has been set by the driver in the past.

In S504, the controller 1 (for example, the UI control unit 204) determines whether an instruction to enable a specific driving assist function has been acquired from the driver. In a case where it is determined that the instruction to enable the specific driving assist function is acquired from the driver ("YES" in S504), the controller 1 shifts the processing to S505, and in the other case ("NO" in S504), the controller 1 repeats S504. The specific driving assist function instructed to be enabled in S504 may be any one of the driving assist functions illustrated in the column 301 of FIG. 3 or any other driving assist function. The instruction to enable a specific driving assist function may be obtained in any manner. For example, the driver may give an instruction by pressing a specific button, or may give an instruction by voice.

In S505, the controller 1 (for example, the travel control unit 201) determines whether the agreement to the use of the specific personal information is necessary to perform the specific driving assist function. In a case where it is determined that the agreement to the use of the specific personal information is necessary to perform the specific driving assist function ("YES" in S505), the controller 1 shifts the processing to S506, and in the other case ("NO" in S505), the controller 1 shifts the processing to S507. The controller 1 may determine whether the agreement to the use of the specific personal information is necessary to perform the specific driving assist function, based on the necessary agreement information 212. For example, in a case where the specific driving assist function that has been instructed by the driver is an extended assist function in the mode 3, the controller 1 determines that agreements to the use of the camera information and the position information are necessary.

In S506, the controller 1 (for example, the travel control unit 201) determines whether the driver agrees to the controller 1 using the specific personal information. In a case where it is determined that the driver agrees to the controller 1 using the specific personal information ("YES" in S506), the controller 1 shifts the processing to S507, and in the other case ("NO" in S506), the controller 1 shifts the processing to S508. The controller 1 may determine whether the driver agrees to the controller 1 using the specific personal information, based on, for example, the agreement information 214. For example, in a case where the specific driving assist function that has been instructed by the driver is the extended assist function in the mode 3, as long as the driver agrees to the use of both the camera information and the position information, the controller 1 determines that the driver agrees to the controller 1 using the specific personal information.

In S507, the controller 1 (for example, the travel control unit 201) enables the driving assist function that has been instructed. S507 is performed, in the case where the driving assist function that has been instructed does not necessitate the agreement to the use of the specific personal information, and the case where the driving assist function that has been instructed necessitates the agreement to the use of the specific personal information and the driver agrees to the use the specific personal information.

S508 is performed, in the case where the instruction to enable the specific driving assist function is given in a state in which the driver does not agree to the use of the specific personal information. In S508, the controller 1 (for example, the UI control unit 204) notifies the driver that the agreement to the use of the specific personal information is necessary in order to enable the driving assist function that has been instructed. This notification may be given, for example, by displaying a message on the display device 5a or outputting sounds from the sound output device 5b. The controller 1 may notify the driver of the type of the personal information that necessitates the agreement (for example, the camera information or the position information).

In response to this notification, the driver may agree to the use of the personal information via the setting screen 400. Then, in response to the driver having instructed to enable the specific driving assist function, the controller 1 performs steps S504 to S507 to enable the driving assist function that has been instructed.

Figure 6:
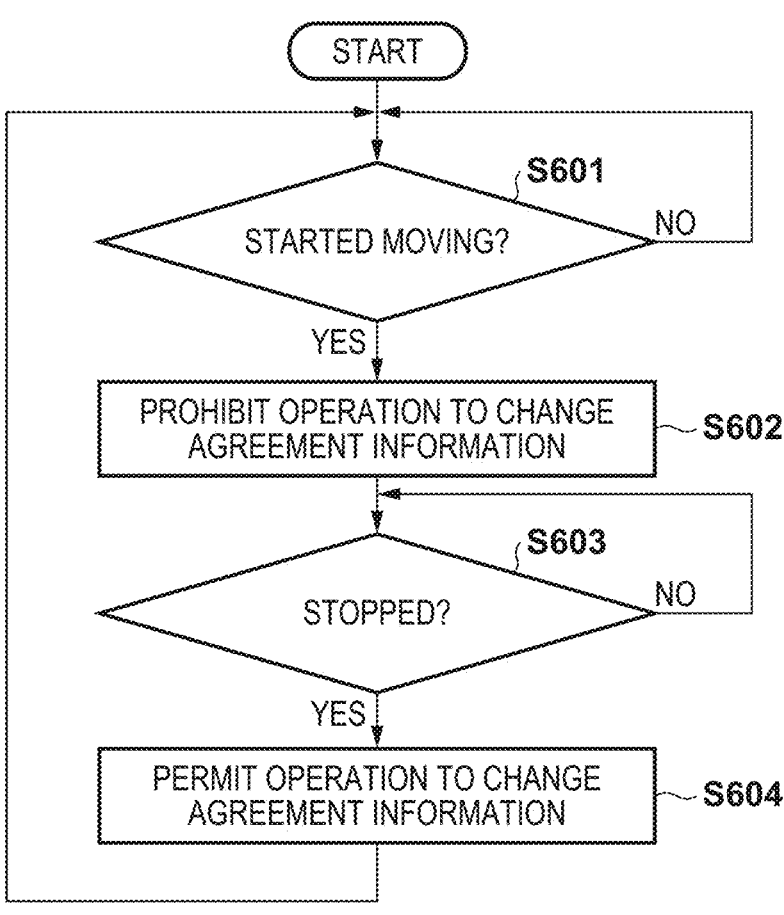
FIG. 6 is a flowchart for describing an operation example for switching between permission and prohibition on a setting change in some embodiments.

Referring to FIG. 6, an example of a method for switching, by the controller 1 of the vehicle V, between permission and prohibition of the operation to change the agreement information 214 will be described. Each step in the method of FIG. 6 may be performed by the processor of the controller 1 executing a program stored in the memory of the controller 1. Alternatively, some or all of the steps in the method of FIG. 6 may be performed by a dedicated integrated circuit such as an ASIC. The method of FIG. 6 may start in accordance with the power source (for example, the ignition power supply) of the vehicle V turning on. The method of FIG. 6 may start in accordance with the power source (for example, the ignition power supply) of the vehicle V turning off.

In S601, the controller 1 (for example, the travel control unit 201) determines whether the vehicle V has started moving. In a case where it is determined that the vehicle V has started moving ("YES" in S601), the controller 1 shifts the processing to S602, and in the other case ("NO" in S601), the controller 1 repeats S601. The controller 1 may determine that the vehicle V has started moving, when the speed of the vehicle V exceeds a threshold. The threshold used in the determination in S601 may be zero or a positive value (for example, 6 km/h).

In S602, the controller 1 (for example, the agreement management unit 202) prohibits the driver from changing the agreement information 214. For example, the controller 1 may set the change permission flag 216 to "prohibited".

In S603, the controller 1 (for example, the travel control unit 201) determines whether the vehicle V is stopped. In a case where it is determined that the vehicle V is stopped ("YES" in S603), the controller 1 shifts the processing to S604, and in the other case ("NO" in S603), the controller 1 repeats S603. The controller 1 may determine that the vehicle V is stopped, when the speed of the vehicle V becomes equal to or smaller than a threshold. The threshold used in the determination in S603 may be zero or a positive value (for example, 2 km/h). In order to keep hysteresis, the threshold used in the determination of S603 may be smaller than the threshold used in the determination of S601. Alternatively, these thresholds may be identical values.

In step S604, the controller 1 (for example, the agreement management unit 202) permits the driver to change the agreement information 214. For example, the controller 1 may set the change permission flag 216 to "permitted".

Referring to FIG. 7, an example of a method for updating, by the controller 1 of the vehicle V, the agreement information 214 will be described. Each step in the method of FIG. 7 may be performed by the processor of the controller 1 executing a program stored in the memory of the controller 1. Alternatively, some or all of the steps in the method of FIG. 7 may be performed by a dedicated integrated circuit such as an ASIC. The method of FIG. 7 may start in accordance with the power source (for example, the ignition power supply) of the vehicle V turning on. The method of FIG. 7 may start in accordance with the power source (for example, the ignition power supply) of the vehicle V turning off.

In S701, the controller 1 (for example, the UI control unit 204) determines whether an operation to change the agreement information 214 has been performed. In a case where it is determined that the operation to change the agreement information 214 has been performed ("YES" in S701), the controller 1 shifts the processing to S702, and in the other case ("NO" in S701), the controller 1 repeats S701. The operation to change the agreement information 214 may be an operation for agreeing to the use of the personal information or an operation for canceling the agreement to the use of the agreement information 214. The operation to change the agreement information 214 may be an operation of any of the toggle switches 401 to 405 on the setting screen 400 or an operation for displaying the setting screen 400.

In S702, the controller 1 (for example, the agreement management unit 202) determines whether the operation to change the agreement information 214 is permitted. In a case where it is determined that the operation to change the agreement information 214 is permitted ("YES" in S702), the controller 1 shifts the processing to S703, and in the other case ("NO" in S702), the controller 1 repeats S704. The controller 1 may determine whether the operation to change the agreement information 214 is permitted, based on, for example, the change permission flag 216.

In S703, the controller 1 (for example, the agreement management unit 202) changes the agreement information 214 in accordance with the change operation by the driver. In S704, the controller 1 (for example, the UI control unit 204) notifies the driver that the operation to change the agreement information 214 is prohibited. This notification may be given, for example, by displaying a message on the display device 5a or outputting sounds from the sound output device 5b. The controller 1 may notify the driver that it is necessary to stop the vehicle V in order to perform the change operation.

In S705, the controller 1 (for example, the agreement management unit 202) determines whether the user authentication has been performed when the vehicle V is started up. In a case where it is determined that the user authentication has been performed when the vehicle V is started up ("YES" in S705), the controller 1 shifts the processing to S706, and in the other case ("NO" in S705), the controller 1 repeats S701.

In S706, the controller 1 (for example, the agreement management unit 202) updates the agreement setting included in the personal setting information 215 in accordance with the change operation by the driver. Accordingly, by performing the user authentication when using the vehicle V next time, the driver is able to use the agreement setting that has been changed.

In the above-described embodiments, in the case where it is determined that the vehicle is not stopped, the controller 1 prohibits the driver from performing the operation to change the agreement information 214. Alternatively, the controller 1 may permit the driver to change the agreement information 214, regardless of whether the vehicle is stopped.

In the above-described embodiments, in the case where the user authentication is successful, the controller 1 uses the agreement setting included in the personal setting information. Alternatively, the controller 1 may not necessarily perform the user authentication, or may not necessarily use the agreement setting included in the personal setting information, in the case where the user authentication is successful.

In the above-described embodiments, the controller 1 gives the notifications in S508 and S704. Alternatively, the controller 1 may not necessarily give such notifications.

Summary of Embodiments

[Item 1] A control device (1) for controlling a vehicle (V), the control device comprising:
  a travel control unit (201) configured to provide a plurality of functions related to traveling of the vehicle; and
  a management unit (202) configured to manage agreement information (214) about whether a driver of the vehicle agrees to the vehicle using specific personal information acquired by a sensor (9a, 9c, 7b) of the vehicle, wherein
  the number of functions executable in a case where the driver does not agree to use of the specific personal information out of the plurality of functions is smaller than the number of functions executable in a case where the driver agrees to the use of the specific personal information out of the plurality of functions.

According to this item, the driver's agreement is necessary for performing a specific function that uses the personal information, so the personal information of the driver of the vehicle is appropriately protected.

[Item 2] The control device according to Item 1, wherein
  the specific personal information includes camera information acquired by a camera (9a) mounted on the vehicle and position information of the vehicle acquired by a positioning sensor (7b) mounted on the vehicle, and
  the management unit allows the driver to respectively select whether to agree to the use of the camera information and whether to agree to the use of the position information.

According to this item, sensitive personal information is appropriately protected.

[Item 3] The control device according to Item 2, wherein
  the plurality of functions includes:
  a first function to be executable in a case where the driver agrees to the use of the camera information and the use of the position information;
  a second function to be executable in a case where the driver agrees to the use of the camera information, regardless of whether the driver agrees to the use of the position information; and
  a third function to be executable in a case where the driver agrees to the use of the position information, regardless of whether the driver agrees to the use of the camera information.

According to this item, performing of a function is limited within a necessary range.

[Item 4] The control device according to Item 3, wherein
  the first function includes at least one of:
    a lane keeping function of keeping a lane, in which the vehicle is traveling, with the use of the position information; and
    a lane change function of changing the lane, in which the vehicle is traveling, with the use of the position information,
  the second function includes
    an emergency deceleration function of decelerating the vehicle in accordance with an occurrence of an abnormality in the driver, and
  the third function includes
    a curve deceleration function of decelerating the vehicle before reaching a curve.

According to this item, performing of a function is limited within a necessary range.

[Item 5] The control device according to Item 1, further comprising
  an authentication unit (203) configured to perform personal authentication of the driver when the vehicle is started up, wherein
  the management unit reads, from a storage device (210), the agreement information stored in association with the driver, and
  the travel control unit determines whether each of the plurality of functions is executable, based on the agreement information that has been read.

According to this item, it is possible to use the agreement setting that has been made by the driver in the past.

[Item 6] The control device according to Item 1, wherein the management unit prohibits the driver from performing a change operation for changing the agreement information, in a case where a determination is made that the vehicle is not stopped.

According to this item, the influence of the change operation on the driving operation can be reduced.

[Item 7] The control device according to Item 1, further comprising:

an acquisition unit (204) configured to acquire, from the driver, an instruction to enable a function that uses the specific personal information; and a notification unit (204) configured to notify the driver that an agreement of the driver is necessary for the use of the specific personal information, in a case where the instruction to enable the function is given in a state in which the driver does not agree to the use of the specific personal information.

According to this item, the driver is able to grasp that the agreement is necessary.

[Item 8] A non-transitory computer-readable storage medium storing a program for causing a computer to function as the control device of Item 1

According to this item, a medium having the above-described advantages is provided.

[Item 9] A vehicle comprising the control device of Item 1.

According to this item, a vehicle having the above-described advantages is provided. [Item 10] A method for controlling a vehicle (V), the method comprising:

providing (S507) a plurality of functions related to traveling of the vehicle; and managing (S703) agreement information about whether a driver of the vehicle agrees to the vehicle using specific personal information acquired by a sensor of the vehicle, wherein the number of functions executable in a case where the driver does not agree to use of the specific personal information out of the plurality of functions is smaller than the number of functions executable in a case where the driver agrees to the use of the specific personal information out of the plurality of functions.

According to this item, the driver's agreement is necessary for performing a specific function that uses the personal information, so the personal information of the driver of the vehicle is appropriately protected.

The invention is not limited to the foregoing embodiments, and various variations/changes are possible within the spirit of the invention.

What is claimed is:

1. A control device for controlling a vehicle, the control device comprising:

a travel control unit configured to provide a plurality of functions related to traveling of the vehicle; and a management unit configured to manage agreement information about whether a driver of the vehicle agrees to the vehicle using specific personal information acquired by a sensor of the vehicle, wherein the number of functions executable in a case where the driver does not agree to use of the specific personal information out of the plurality of functions is smaller than the number of functions executable in a case where the driver agrees to the use of the specific personal information out of the plurality of functions, the specific personal information includes camera information acquired by a camera mounted on the vehicle and position information of the vehicle acquired by a positioning sensor mounted on the vehicle, the management unit allows the driver to respectively select whether to agree to the use of the camera information and whether to agree to the use of the position information, and the plurality of functions includes:

a first function to be executable in a case where the driver agrees to the use of the camera information and the use of the position information;

a second function to be executable in a case where the driver agrees to the use of the camera information, regardless of whether the driver agrees to the use of the position information; and a third function to be executable in a case where the driver agrees to the use of the position information, regardless of whether the driver agrees to the use of the camera information.

2. The control device according to claim 1, wherein the first function includes at least one of:

a lane keeping function of keeping a lane, in which the vehicle is traveling, with the use of the position information; and a lane change function of changing the lane, in which the vehicle is traveling, with the use of the position information, the second function includes an emergency deceleration function of decelerating the vehicle in accordance with an occurrence of an abnormality in the driver, and the third function includes a curve deceleration function of decelerating the vehicle before reaching a curve.

3. The control device according to claim 1, further comprising an authentication unit configured to perform personal authentication of the driver when the vehicle is started up, wherein the management unit reads, from a storage device, the agreement information stored in association with the driver, and the travel control unit determines whether each of the plurality of functions is executable, based on the agreement information that has been read.

4. The control device according to claim 1, wherein the management unit prohibits the driver from performing a change operation for changing the agreement information, in a case where a determination is made that the vehicle is not stopped.

5. The control device according to claim 1, further comprising:

an acquisition unit configured to acquire, from the driver, an instruction to enable a function that uses the specific personal information; and a notification unit configured to notify the driver that an agreement of the driver is necessary for the use of the specific personal information, in a case where the instruction to enable the function is given in a state in which the driver does not agree to the use of the specific personal information.

6. A non-transitory computer-readable storage medium storing a program for causing a computer to function as the control device of claim 1.

7. A vehicle comprising the control device of claim 1.

8. A method for controlling a vehicle, the method comprising:

providing a plurality of functions related to traveling of the vehicle; and managing agreement information about whether a driver of the vehicle agrees to the vehicle using specific personal information acquired by a sensor of the vehicle, wherein the number of functions executable in a case where the driver does not agree to use of the specific personal information out of the plurality of functions is smaller than the number of functions executable in a case where the driver agrees to the use of the specific personal information out of the plurality of functions, and the specific personal information includes camera information acquired by a camera mounted on the vehicle and position information of the vehicle acquired by a positioning sensor mounted on the vehicle, the method further comprises allowing the driver to respectively select whether to agree to the use of the camera information and whether to agree to the use of the position information, wherein the plurality of functions includes:

a first function to be executable in a case where the driver agrees to the use of the camera information and the use of the position information:

a second function to be executable in a case where the driver agrees to the use of the camera information, regardless of whether the driver agrees to the use of the position information; and a third function to be executable in a case where the driver agrees to the use of the position information, regardless of whether the driver agrees to the use of the camera information.

9. A control device for controlling a vehicle, the control device comprising:

a travel control unit configured to provide a plurality of functions related to traveling of the vehicle; and a management unit configured to manage agreement information about whether a driver of the vehicle agrees to the vehicle using specific personal information acquired by a sensor of the vehicle, wherein the travel control unit suppresses performing a function of the plurality of functions that requires use of the specific personal information that the driver does not agree to use to provide the function, by suppressing enabling the function, the specific personal information includes camera information acquired by a camera mounted on the vehicle and position information of the vehicle acquired by a positioning sensor mounted on the vehicle, the management unit allows the driver to respectively select whether to agree to the use of the camera information and whether to agree to the use of the position information, and the plurality of functions includes:

a first function to be executable in a case where the driver agrees to the use of the camera information and the use of the position information;

a second function to be executable in a case where the driver agrees to the use of the camera information, regardless of whether the driver agrees to the use of the position information; and a third function to be executable in a case where the driver agrees to the use of the position information, regardless of whether the driver agrees to the use of the camera information.

10. A non-transitory computer-readable storage medium storing a program for causing a computer to function as the control device of claim 9.

11. A vehicle comprising the control device of claim 9.

* * * * *